United States Patent [19]
Harriman et al.

[11] Patent Number: 5,313,624
[45] Date of Patent: May 17, 1994

[54] DRAM MULTIPLEXER

[75] Inventors: Guy Harriman, Palo Alto; Mark Ross, San Carlos, both of Calif.

[73] Assignee: Next Computer, Inc., Redwood City, Calif.

[21] Appl. No.: 699,911

[22] Filed: May 14, 1991

[51] Int. Cl.⁵ .............................................. G06F 11/10
[52] U.S. Cl. .................................. 395/575; 371/40.1; 395/275; 395/425
[58] Field of Search ............... 371/40.1; 395/250, 325, 395/425, 275; 364/238, 238.7, 239.5, 239.1, 948.3, 948.31, 962.2

[56] References Cited

U.S. PATENT DOCUMENTS

| | | | |
|---|---|---|---|
| 4,644,463 | 2/1987 | Hotchkin et al. | 395/250 |
| 4,688,166 | 8/1987 | Schneider | 395/275 |
| 4,951,246 | 8/1990 | Fromm et al. | 395/425 |
| 4,953,103 | 8/1990 | Suzuki | 395/425 |
| 4,965,801 | 10/1990 | DuLac | 371/40.1 |
| 5,159,679 | 10/1992 | Culley | 395/425 |
| 5,163,132 | 11/1992 | DuLac et al. | 395/275 |

*Primary Examiner*—Charles E. Atkinson
*Attorney, Agent, or Firm*—Hecker & Harriman

[57] ABSTRACT

The present invention provides a system for supporting one or more memory requestors (CPU's and I/O DMA) accessing a plurality of DRAM memory banks. The present invention is a multiplexer that functions as a 16-bit slice of the interface between the CPU and a 64-bit slice of DRAM memory array. The invention includes an error correction (ECC) module, a 64-bit DRAM I/O channel, an 8-bit ECC "syndrome" I/O channel and an 8-bit slice of a DMA bus I/O channel. In a write operation, the CPU transmits data through the I/O channel to write the data to the DRAM. Each word is routed by the four-way multiplexer to one of the four memory registers. When the four registers have been filled with data words, the words are assembled into a multiple word burst and sent to the DRAM bank. The data is also passed through an error correction module. For a read operation, DRAM data is latched into the CPU register and transported to the CPU while the DRAM is potentially being accessed for another memory read.

20 Claims, 10 Drawing Sheets

DRAM MULTIPLEXER

BACKGROUND OF THE INVENTION

1. FIELD OF THE INVENTION

This invention relates to the field of multiplexed DRAM input/output systems that allow for high bandwidth CPU operation.

2. BACKGROUND ART

A typical computer system consists of a number of modules or components. Computer systems typically include a central processing unit (CPU) such as a microprocessor. The microprocessor is a program-controlled device that obtains, decodes and executes instructions. A computer system also includes program storage components for storing program instructions, and data storage components for storing data. These storage components may be read only memory (ROM), random access memory (RAM), disk or tape storage, or any other suitable storage means.

A computer system typically also includes input/output (I/O) components for connecting external devices to the microprocessor. Special purpose components, such as memory management units or co-processors, may also be part of the computer system.

The memory component, also known as a "main memory," is a scarce resource that is dynamically allocated to users, programs or processes. Main memory is typically a silicon-based memory such as a RAM. In many applications, dynamic random access memory (DRAM) is used as the main memory. Processor main memory is "byte" organized. That is, memory is arranged as a sequence of 8-bit bytes and the byte is the smallest unit of information accessed out of the memory. In one convention, an entire row is selected by a row address and columns are accessed in groups of 8 bits. In some implementations, 16-bit words (2 bytes) or 32-bit words (4 bytes) are accessed at one time.

A block diagram of a memory module is illustrated in FIG. 1. The memory module is generally indicated by the elements within boundary 101. The memory module 101 comprises a row select decoder 102 coupled to a memory array 103. A column select decoder 107 is coupled through column input/output circuits 105 to memory array 103. Column input/output circuits 105 receive input data control signals from input data control block 104 and provides data to output buffers 106. A control logic block 108 provides a read signal 112 to output buffers block 106. Row address bus lines $A_0$-$A_{i-1}$ are coupled to row select decoder block 102. The row select decoder block 102 interprets the information on the address bus lines $A_0$-$A_{i-1}$ so that the appropriate row of memory array 103 can be selected. The memory array 103 comprises a plurality of memory elements arranged in rows and columns.

Column addresses are provided on address bus lines $A_i$-$A_{N-1}$. These addresses are provided to column select decoder block 107. Column select decoder block 107 interprets the address information and provides a column select signal to the column input/output circuits 105. The column input/output circuits 105 provide the column select signal to the memory array 103 so that the appropriate column groups can be selected.

The memory module 101 also includes a control logic block 108 that receives read, write and CS signals. When the control logic block receives a write command, it enables input data control block 104 to receive data from data bus lines 110. The input data control block 104 provides the data to column input/output circuit 105 which can then write it into the memory array 103 at appropriate column and row locations. For read operations, the control logic block 108 provides a read signal 112 to output buffers 106. Information is read from memory array 103 and provided by column input/output circuits block 105 to output buffers 106 and eventually to data output lines 111. In many implementations, the data bus lines 110 are shared with the data output lines 111.

In the case of dynamic random access memories, periodic refreshing is required so that the storage contents can be maintained. Memory refreshing may be done either by the CPU or by an external refresh controller. Memory refreshing can be completely transparent (that is, done during gaps in the CPU timing) or partially transparent, (by inserting a refresh cycle after a "next instruction fetch" cycle). Refreshing is accomplished by applying current to capacitors associated with each memory cell.

It is often desired to expand the amount of main memory that can be accessed by a processor or CPU. One method of increasing available addressable memory is known as "bank switching." In a bank switching scheme, main memory consists of a number of separate physical memory blocks or memory banks. Consider the situation where a microprocessor or CPU issues an N-bit address. Each memory bank then consists of $2^N$ contiguously addressed physical locations numbered from zero to $2^{N-1}$. In a bank switching scheme, one bank of memory is enabled while all other banks remain disabled. Bank selector logic, under the control of an appropriate supervisor program, selects one of the memory banks to receive the CPU address.

To access the memory, a CPU or I/O controller must assert an address on all banks and assert the output enable on the one bank in which the desired data is stored. Unfortunately, this has the disadvantage of being slower than true multiplexing of memory banks, due to the long turn-on and turn-off time of DRAM output enable, and of presenting the capacitive loads of all of the banks onto the same data bus wires.

Another aspect common in DRAM memory systems is the provision of error correction for protecting against data errors when reading from memory. Error correction code (ECC) is a standard, widely-implemented data protection function, often used for magnetic media. Prior art implementations of ECC as well as prior art means for accessing the DRAM memory, however, have not supported the full utilization of the memory bandwidth.

A number of memory management schemes are described in the prior art. For example, U.S. Pat. No. 4,901,230 to Chen, et al., describes a multiprocessing system implementing two processors in a shared register section. Each processor has several parallel ports to the main memory. Chen, et al., makes use of buffer registers (674-681) and multiplexers (690-691) to output data to the memory. Although multiprocessing is supported, no extra circuitry is described which would enhance the DRAM bandwidth.

Sundet, U.S. Pat. No. 4,630,230, describes an add-on storage system. The system of Sundet attempts to minimize fan in, fan out and addressing requirements by organizing the storage into a plurality of sections. The memory address is supplied to all sections and then data words are passed in and out in a serial fashion from section to section using registers. In a read operation, each section outputs a word to its register simultaneously, then transfers the word from section to section out to the port. In a write operation, the opposite transaction takes place.

Amitai, U.S. Pat. No. 4,797,850, describes a dynamic random access memory controller with multiple independent control channels. The memory controller is used to create address strobe signals to access individual bytes of memory out of the DRAM.

Halford, U.S. Pat. No. 4,807,121, is directed to a peripheral interface system having an input-output processor (IOP) including a RAM memory, provided to perform certain input-output tasks for a CPU. The system further includes a multiplexer which multiplexes data between an IOP DMA (direct memory access) port and up to four disk controller units and two data buffers, respectively. Data is transferred between the multiplexer and the local memory in groups of four parcels, with each group associated with a lone channel.

Shinoda, et al., U.S. Pat. No. 4,912,679, describes a buffered addressing system that adjusts the processor address rate to the relatively slow memory address rate. With this system, the processor itself does not have to compensate for the slow speed of the memory addressing and thus can operate at a much more efficient rate.

From, et al., U.S. Pat. No. 4,951,246, is directed to a pipelined group storage system. A nibble mode DRAM is deployed in a plurality of memory banks and addressing circuitry is adapted to address the DRAM in nibble mode cycles from a plurality of ports.

SUMMARY OF THE PRESENT INVENTION

The present invention provides a means for supporting one or more memory requestors (CPU's and I/O DMA), with the efficient utilization of the memory bandwidth from DRAM's. The present invention also provides a method of protecting against data errors when reading from memory, and of efficiently supporting burst (multiple word) transfers.

The present invention is a multiplexer that functions as a 16-bit building block or slice for the interface between a CPU and a DRAM memory bank having multiples of 16-bit data buses. Thus, a 32-bit CPU uses two building blocks to connect to a 128-bit wide array of DRAM, and a 64-bit CPU uses four building blocks to connect to a 256-bit wide array of DRAM. The invention features a 16-bit CPU I/O channel, a 4-way multiplexer, four 16-bit memory registers, an error correction (ECC) module, a 64-bit DRAM I/O channel, an 8-bit ECC "syndrome" I/O channel and an 8-bit DMA I/O channel. The present invention is used during the following processes:

(1) Writing data from the CPU to the DRAM;
(2) Reading data from the DRAM to the CPU;
(3) Performing DMA I/O accesses to and from DRAM; and
(4) Performing I/O programming and status register accesses by the CPU.

The CPU transmits data in the form of 16-bit words to the present invention through the invention's 16-bit I/O channel to the DRAM. Each word is routed by the 4-way multiplexer of the present invention into one of its four 16-bit memory registers. When the four registers have been filled with four 16-bit words, the four words are assembled into a 64-bit "four-word burst" and sent as a single 64-bit data set through the 64-bit DRAM I/O channel to the DRAM bank. The data is passed through an ECC error detection and correction module along the way. The syndrome for a multiple slice, i.e., 64-bit CPU data bus, is generated and stored as vertical ECC. That is, each slice of the 4-word burst is held separately.

If the data is to be stored in an error correcting form, the ECC module generates an 8-bit error correction index, or "syndrome," from the 64-bits of data being transferred. This 8-bit ECC syndrome is stored in DRAM together with the 64 bits of data from the CPU, resulting in the use of a total of 72 bits of memory.

A read operation from DRAM to the CPU is the reverse of the write operation described above. Data is read from DRAM in 64-bit blocks and divided into four 16-bit words, each of which is stored in one of the invention's 16-bit memory registers. If error correction is used, the ECC syndrome corresponding to the 64 bits of data being transferred is also read from the DRAM by the ECC module. The ECC module generates a syndrome from the 64-bits of data being transferred and compares the generated syndrome to the received syndrome. If there are no errors, the syndromes match. If there is a one bit error, the syndrome comparison indicates which bit needs to be corrected. When this occurs, the data in the four registers is sent to a correction module and corrected. The syndrome comparision also indicates whether there is a 2-bit or more error. Finally, a 16-bit word is multiplexed from the four registers (after correction, if necessary) and sent to the CPU.

Because the present invention accepts a 16-bit word from each bank and multiplexes the correct word to the CPU, the method of the present invention provides faster memory access than prior art methods. This is because the present invention avoids the long turn-on and turn-off times of the DRAM output enable. In addition, the present invention implements a pipeline system, allowing the next memory reference to begin while the CPU is reading the data from the previous access. Multiple memory requestors can be supported while maintaining full utilization of the memory bandwidth for memory reads. This can be done by holding the data from one read in the register of the present invention while the access for the next read is being done in the DRAM's. By alternating 64-bit transfers from each CPU to DRAM, or having multiple outstanding requests from one CPU, such that the transfer of one 64-bit forward burst from one CPU takes place while the read for the other CPU is being accessed in DRAM, it will appear to each CPU that it has exclusive use of the DRAM. This mechanism allows the overlap of read data access from DRAM with the transport of data for the previous read, due to the presence of a staging register inside the invention.

An additional advantage of the present invention is that the ECC correction is built into the pipeline structure. This provides data integrity to the system. The ability to overlap the ECC computation of one memory read with the access of the next memory read gives the invention a significant speed advantage over other possible solutions.

The invention also gives a convenient place for the combining of I/O DMA and the CPU to DRAM connection. The buffer registers for DMA memory accesses remove the need for traditional DMA bus sharing, by allowing data assembly inside the invention to take place concurrently with CPU DRAM accesses. Additionally, the frequency of operation of the DMA bus and CPU bus can be different, thereby allowing for faster CPU to memory connections while maintaining a constant speed DMA bus.

DETAILED DESCRIPTION OF THE INVENTION

A multiplexed DRAM control system is described. In the following description, numerous specific details, such as address bus width, number of data words, etc., are set forth in detail in order to provide a more thorough description of the present invention. It will be apparent, however, to one skilled in the art, that the present invention may be practiced without these specific details. In other instances, well known features have not been described in detail so as not to unnecessarily obscure the present invention.

The present invention is a memory multiplexer that implements a high bandwidth path between one or more memory requestors, such as a CPU, and a dynamic random access memory. The present invention also includes means for ensuring data integrity and supports burst (four words per access) transfers. The present invention provides true memory multiplexing (instead of the prior art use of the DRAM output enable) resulting in higher access bandwidth. In addition, the present invention overlaps ECC computation of one memory read cycle with the access of the next memory read, effectively hiding the ECC computation and improving overall bandwidth.

Figure 10:
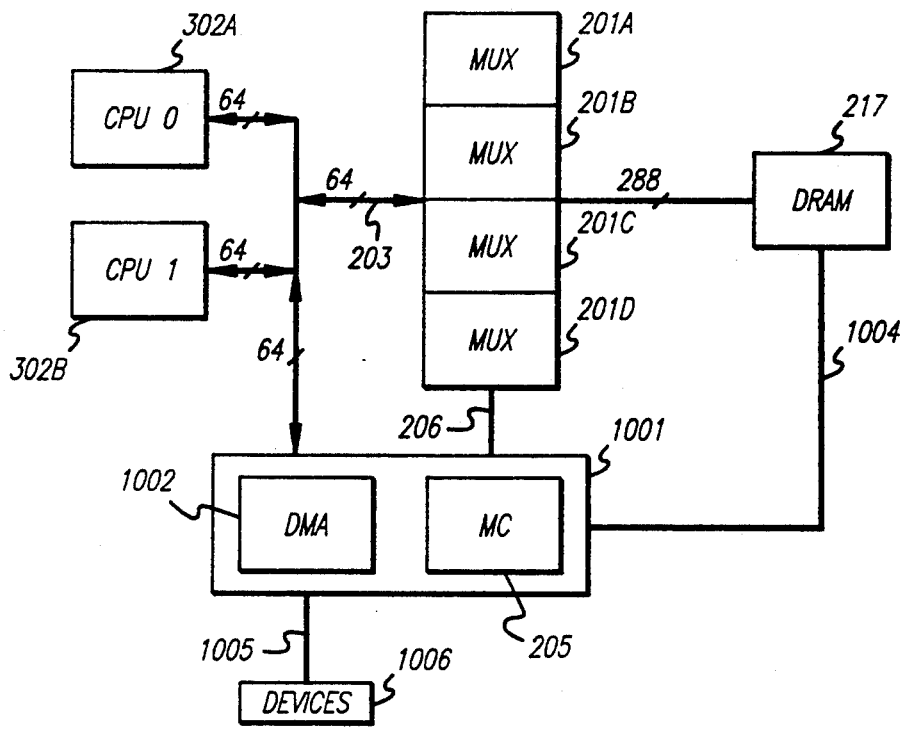
FIG. 10 is a block diagram illustrating the present invention.

FIG. 10 is a block diagram of the present invention in connection with a plurality of 64-bit memory requestors. Processor 302A (CPU0) and processor 302B (CPU1) communicate over 64-bit data buses to 64-bit bus 203. 64-bit data bus 203 connects to four 16-bit multiplexers, 201A-201D. In the preferred embodiment of the present invention, each multiplexer is 16 bits, so that four multiplexers are required to connect to a 64-bit data bus. The present invention is not limited to multiplexers with 16-bit data buses and other data bus widths may be utilized without departing from the scope of the present invention.

Another memory requestor, block 1001, is coupled to the DRAM through multiplexer 201A-201D. Block 1001 includes a direct memory access (DMA) block 1002 and a memory controller 205. A number of devices 1006 make direct memory access requests over bus 1005 through DMA block 1002. The memory controller communicates with the multiplexers 201A-201D through lines 206 and to DRAM 217 over line 1004.

As is illustrated in FIG. 10, the multiplexer of the present invention acts as an interface between memory requestors such as CPU's, memory controllers and DMA's and a memory such as DRAM 217.

Figure 11:
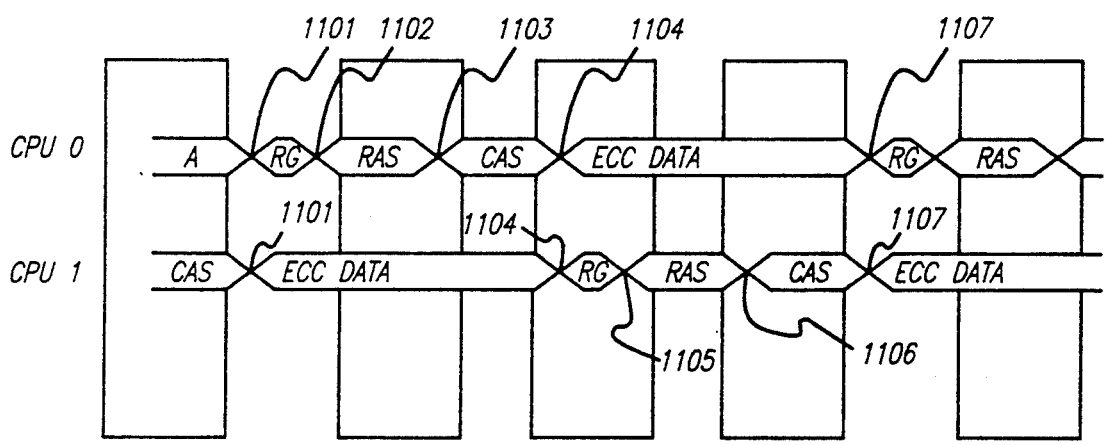
FIG. 11 is a timing diagram illustrating a pipelined read operation.

The timing for read operations for CPU0 and CPU1 are illustrated in FIG. 11. At time 1101, CPU0 makes a bus request and receives a bus grant. At the same time, CPU1 performs an ECC detection and correction and transports data from the DRAM's. At time 1102, CPU0 performs a row address strobe. At time 1103, CPU0 performs a column address strobe. At time 1104, CPU0 begins error correction and data access. At the same time, CPU1 makes a bus request and bus grant transaction. At time 1105, CPU1 executes a row access strobe, and at time 1106, CPU1 executes a column access strobe. At time 1107, CPU1 begins receiving data and CPU0 begins a bus request and grant cycle. The pipelining of the access of CPU0 and CPU1 is such that both processors appear to have exclusive control over the DRAM. In reality, the overlapping of processor operations provides greater memory efficiency utilizing the present invention.

Figure 12:
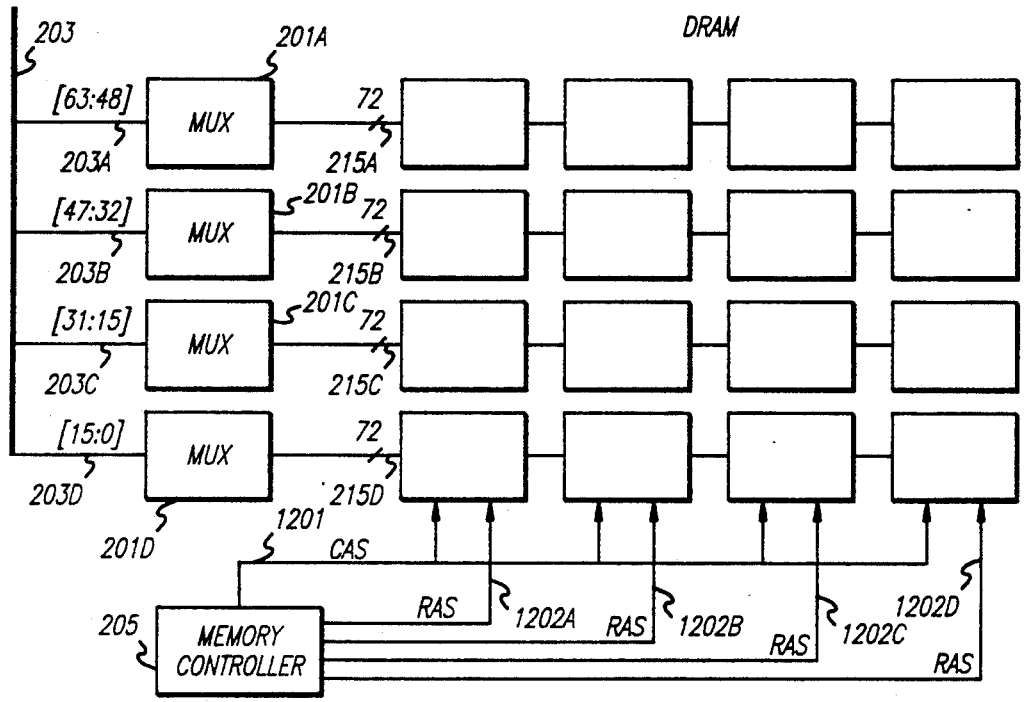
FIG. 12 is a block diagram illustrating the multiplexing of the present invention.

The coupling of the multiplexers 201A-201D to the CPU data bus 203 is illustrated in FIG. 12. The data bus 203 is divided into 16 bit slices, 203A-203D, and these 16 bits are provided to multiplexers 201A-201D, respectively. Each multiplexer collects four 16-bit words in the preferred embodiment of the present invention and provides a 64-bit burst output on lines 215A-215D to DRAM memory banks. In FIG. 11, buses 215A-215D are illustrated as 72-bit buses with 64-bits of data and an additional 8-bit error correction syndrome. The memory controller 205 provides column address strobe signal 1201 to the DRAM memory banks as well as row address strobe signals 1202A-1202D.

Figure 13:
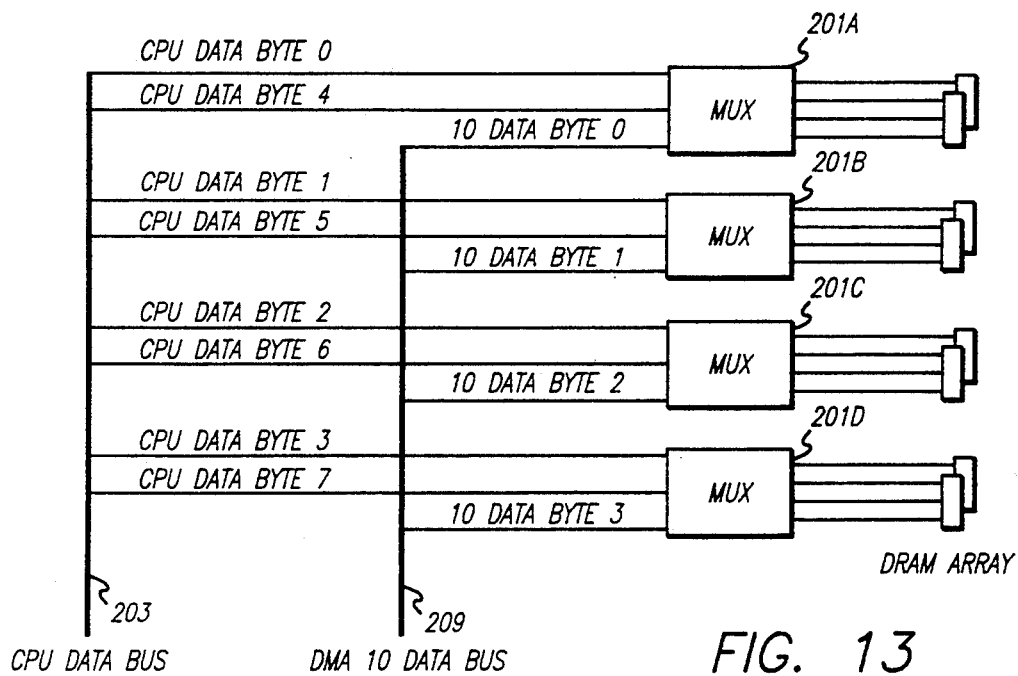
FIG. 13 is a block diagram illustrating the CPU and I/O data byte multiplexing of the present invention.

The multiplexing of data on the CPU data bus and the DMA I/O data bus is illustrated in FIG. 13. CPU data byte zero and CPU data byte four are provided to multiplexer 201A. CPU data bytes one and five are provided to multiplexer 201B. CPU data bytes two and six are provided to multiplexer 201C and CPU data bytes three and seven are provided to multiplexer 201D. I/O data bytes zero through three are provided on DMA I/O data bus 209 to multiplexers 201A-201D, respectively.

The architecture of the present invention permits the CPU and DMA I/O buses to be frequency independent of each other. This allows faster CPU to memory connections while maintaining a constant speed DMA bus. In addition, the present invention can be used with CPU's of varying clock speed and future generation, higher clock speed CPU's while still permitting existing I/O buses to be operated at original speed.

Figure 1:
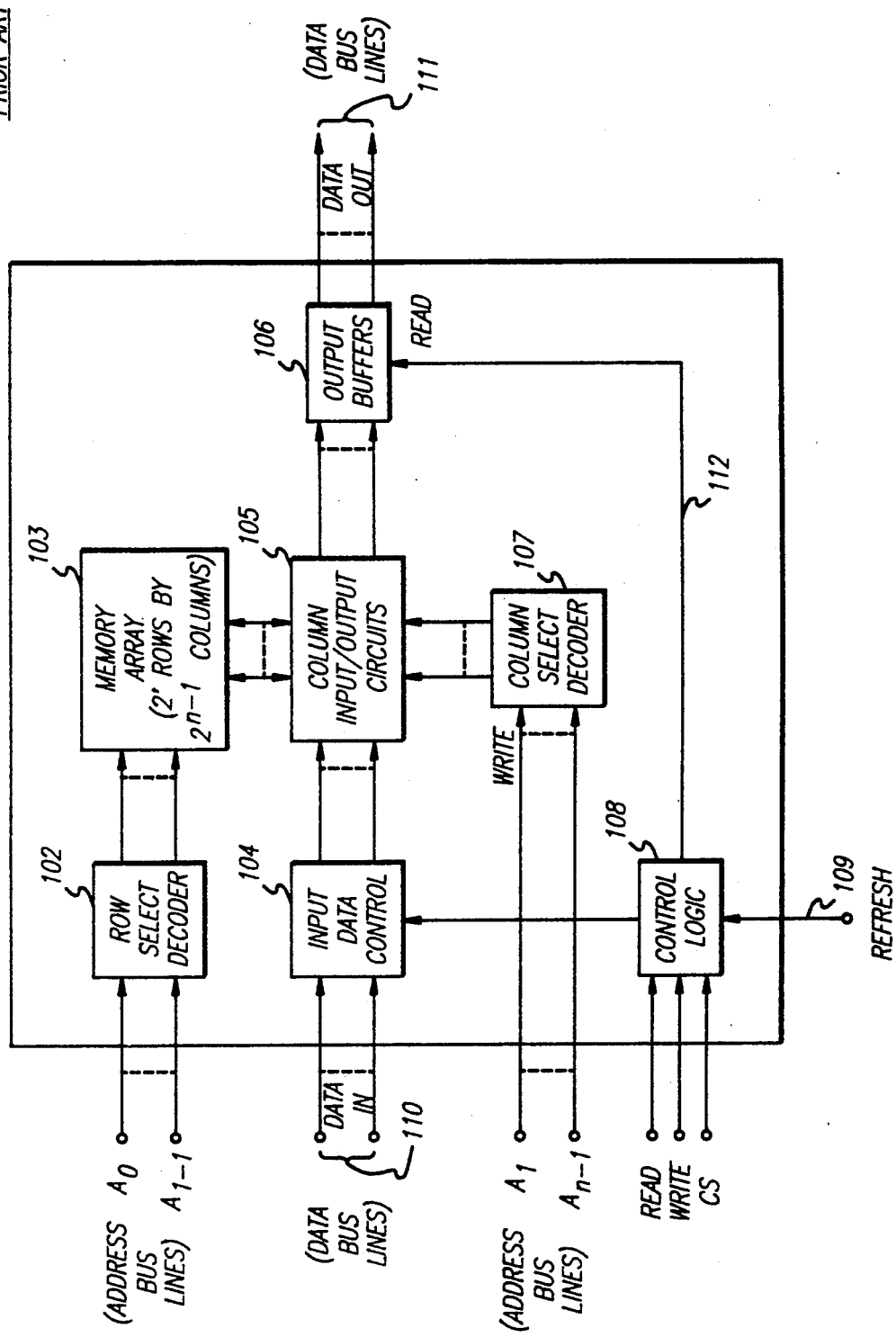
FIG. 1 is a block diagram illustrating a prior art memory module.
Figure 2:
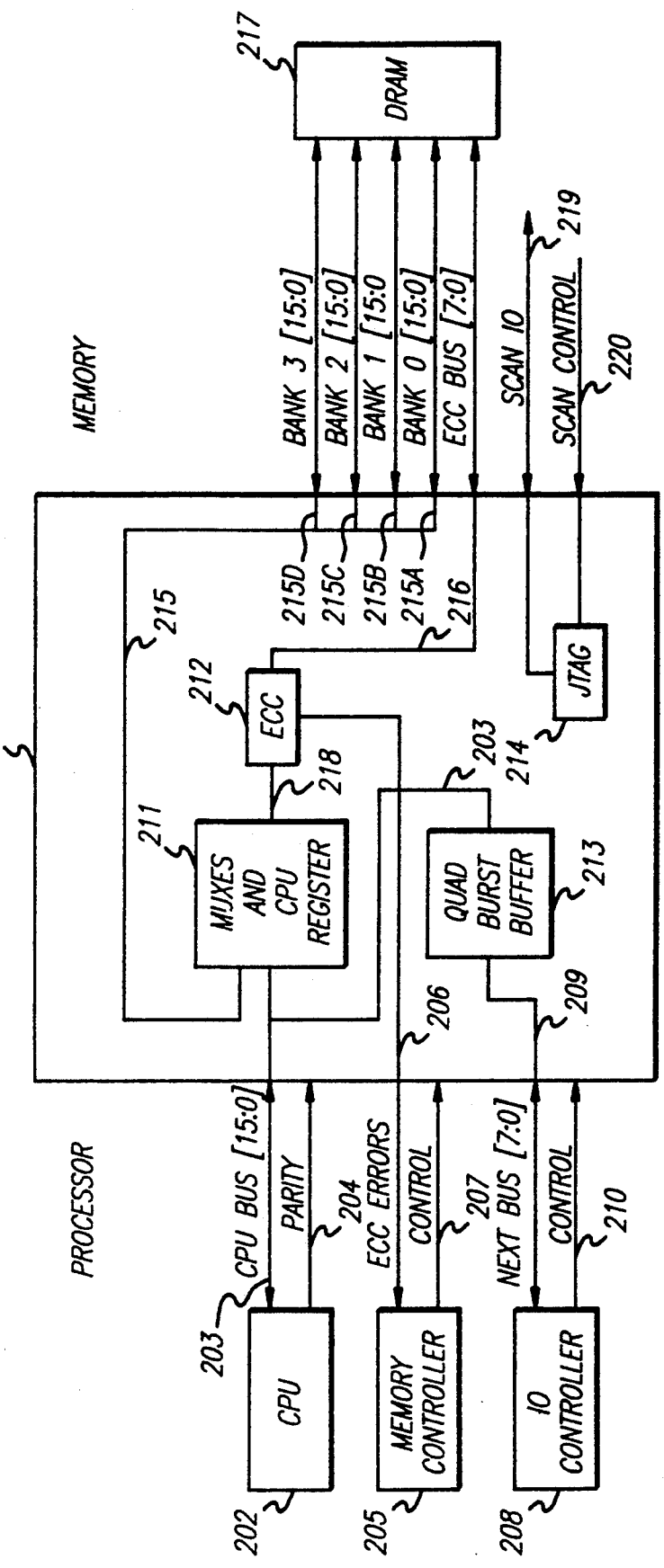
FIG. 2 is a block diagram of the memory multiplexer of the present invention.

A block diagram illustrating a multiplexer 201 of the present invention is illustrated in FIG. 2. For purposes of example, the present invention is described in connection with a four memory bank system. It is understood, however, that the present invention has equal application to other multiples of memory banks. For example, the present invention can be practiced with two memory banks. Such a configuration can be used to couple a 32 bit CPU to two banks of DRAM (128 bits wide). Other configurations, such as eight or sixteen memory banks, can be implemented with the present invention.

The memory multiplexer is generally indicated by those elements enclosed in block 201. The memory multiplexer 201 is coupled to a CPU 202 via CPU bus 203. In the preferred embodiment of the present invention, the CPU bus 203 is a 16-bit bus. Parity information is provided on parity bus 204 coupled between the CPU 202 and the multiplexer 201.

A memory controller block 205 provides control signals 207 to the multiplexer 201 and receives ECC error signals 206 from the multiplexer 201. An input-/output (I/O) controller 208 also provides control signals 210 to the multiplexer 201. The I/O controller is also coupled to the multiplexer through an 8-bit bus (NextBus) 209.

The multiplexer is coupled to four memory banks of DRAM 217 on lines 215A-215D. In the preferred embodiment of this invention, lines 215A-215D are each 16-bit buses. An 8-bit ECC bus 216 links the DRAM 217 and multiplexer 201.

The multiplexer 201 includes the following components. A multiplexer and CPU register block 211 are coupled to the CPU bus 203. Block 211 is also coupled to the memory banks on bus 215. An ECC block 212 is coupled to the register block 211 on bus 218 and communicates with DRAM 217 on ECC bus 216. The ECC block 212 also provides ECC error and correction signals 206 to the memory controller. Quad burst buffer block 213 is coupled to the CPU bus 203 and to the I/O bus 209. The quad burst buffer stores four bursts of DMA data to maximize the bandwidth of the I/O bus 29. A JTAG block 214 receives scan control signals 220 and is coupled to scan I/O line 219.

During a write operation, the CPU 202 transmits 16-bit words on bus 203 to the register block 211 of the multiplexer interface 201. The multiplexer and register block 211 stores each of four consecutive 16-bit words in one of four CPU registers. After four words have been collected, a single 64-bit word transfer is made on line 215 to the DRAM 217. If the error correction mode is to be selected, the ECC block 212 generates a syndrome and provides it on line 218 to the CPU registers 211. The 64-bit word plus an 8-bit syndrome is then transmitted on line 215 to the DRAM 217. The 8-bit syndrome consists of a 7-bit Hamming code, and an additional parity bit that allows for 2-bit error detection.

In a read operation, each of the DRAM banks provides a 16-bit word to the register block 211 via line 215. The words are then read out, one 16-bit word at a time, on bus 203 to the CPU 202. When error correction is used, the ECC syndrome is also provided from the RAM to the ECC module 212 on line 216.

Figure 3:
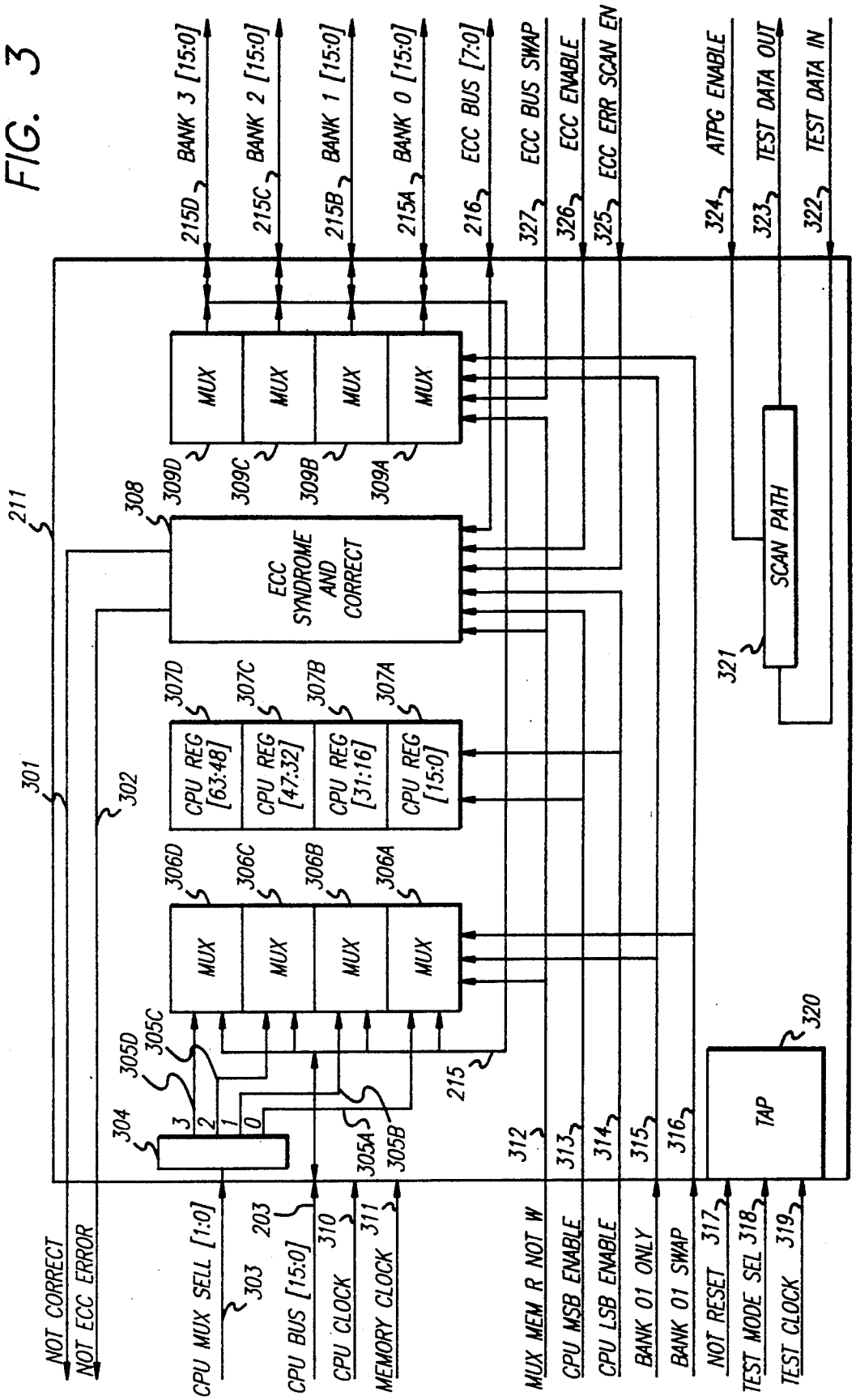
FIG. 3 is a block diagram illustrating the multiplexers and CPU register block of FIG. 2.

FIG. 3 illustrates the CPU to memory data multiplexer logic diagram. The CPU bus 203 is coupled through multiplexers 306A-306D to CPU registers 307A-307D. The CPU bus can collect read data from the CPU registers or assemble write data into the CPU registers. In the preferred embodiment of the present invention, the CPU registers are 16 bits each, for a total of 64 bits. The data on the CPU bus 203 is multiplexed into the appropriate register via cpuMuxSel signal 303 through selector block 304. Selector block 304 provides output 305A-305D to multiplexers 306A-306D, respectively. Register block 211 also receives a cpuClock 310 and memoryClock signal 311.

A muxMemRNotW signal 312 is coupled to the multiplexers 306A-306D, CPU registers 307A-307D, ECC syndrome and correct block 308 and multiplexers 309A-309D. This signal is from the memory controller block 205 and determines the direction of CPU data flow through the multiplexer. When this signal is high, the CPU bus 203 is in the output direction and the memory bank buses 215A-215D are in the input direction. When the signal 312 is high, the ECC logic checks the data in the CPU registers 307A-307D with the ECC bus data held in the 8-bit ECC register and corrects the output of the CPU registers 307A-307D if a single bit is incorrect. When the signal 312 is low, the ECC logic generates the ECC bus syndrome and ECC parity output, and the CPU bus 203 is in the input direction and the memory bank buses 215A-215D are in the output direction.

A cpuMSBEnable signal 313 is coupled to registers 307A-307D and ECC block 308. This signal 313 is a register enable output and it latches the most significant byte of 16 bits of input data selected from the CPU registers 307A-307D on the positive edge of cpuClock signal 310. The data stored in the CPU register is held until the next positive edge of CPU clock when signal 313 is asserted. If signal 312 is high for a read, then a positive edge on CPU clock 310 with signal 313 asserted latches the ECC bus inputs.

Control of the registers (full loading or partial loading) is provided in part by bank01Only signal 315. If desired, the present invention can be used with only two memory banks (bank zero and bank one). The bank01Only signal 315 is used to select two bank mode. If muxMemRNotW 312 is high for a read access, and the bank01Only input 315 is low, the full 64-bit CPU register 307A-307D is selected for loading with the value of bank 215A-215D. If muxMemRNotW 312 is low for a write access, only the 16 bits selected by cpuMuxSel 303 from the 64-bit CPU register 307A-307D is available to be loaded with the value of cpuBus 203. If the bank01Only input 315 is high, then only the pair of banks selected by the bank01Swap input 316 are latched in the 64-bit internal CPU register.

bank01Only signal 315 is coupled to multiplexers 306A-306D and multiplexers 309A-309D, along with bank01Swap signal 316. The bank01Only control line enables banks 0 and 1 only to be used when it is high. The bank01Only input enables the bank01Swap input to implement a two way (32:16) data multiplexer function from the CPU port. The two way multiplexer is bidirectional; the least or the most significant half of the CPU register can be loaded from bank[1:0][15:0], or bank[1:0][15:0] can be driven from the least or the most significant half of the CPU register. This function permits only two banks of DRAM to be populated, while maintaining ECC over 64 bits. This input is sampled on the rising edge of memoryClock 311.

When the bank01Only control line is high, and the bank01Swap control input is low, bank 0 and 1 are connected to cpuRegister[31:0]. When the bank01Only control line is high and the bank01Swap control input is high, banks 0 and 1 are connected to cpuRegister[63:32], as follows:

TABLE 1

| Two-Bank-Only Bank to CPU Register Connection | | | |
|---|---|---|---|
| bank01Only | bank01Swap | CPU register[31:16] | CPU register[15:0] |
| 0 | 0 | bank 1 | bank 0 |

TABLE 1-continued

Two-Bank-Only Bank to CPU Register Connection

| bank01Only | bank01Swap | CPU register[31:16] | CPU register[15:0] |
|---|---|---|---|
| 0 | 1 | bank 1 | bank 0 |
| 1 | 0 | bank 1 | bank 0 |
| 1 | 1 | bank 3 | bank 2 |

TABLE 2

Two-Bank-Only CPU Register to Bank Connection

| bank01Only | bank01Swap | bank1 | bank0 |
|---|---|---|---|
| 0 | 0 | CPU register[31:16] | CPU register[15:0] |
| 0 | 1 | CPU register[31:16] | CPU register[15:0] |
| 1 | 0 | CPU register[31:16] | CPU register[15:0] |
| 1 | 1 | CPU register[63:48] | CPU register[47:32] |

This input is sampled on the rising edge of memoryClock.

notReset signal 317, testModelSelect signal 318 and testClockSignal 319 are coupled to tap block 320. ECC block 308 communicates on ECC bus 216.

Testability is supported by the use of internal scan for automatic test pattern generation (ATPG), and boundary scan for facilitating board scan testing (JTAG).

The notReset input forces the JTAG TAP controller asynchronously into its reset state when it is low. It has an internal resistive pullup on it, holding it high if the PCB trace connected to it is broken. It is used during test and initialization, and avoids the possibility of contention between connected scan path I/O's which could power up in the output state.

eccEnable signal 326 is coupled to ECC syndrome and correction block 308. The eccEnable input causes the ECC single bit error correction and double bit error detection logic to be invoked.

If the muxMemRNotW 312 input is high, the present invention is being used for a read access, and the ECC syndrome and parity bit read from memory are checked against the data read from memory, which was previously loaded into the cpuRegister. If eccEnable 326 is not asserted, the cpuBus is connected directly to the cpuRegister.

If the muxMemRNotW 312 input is low, the data multiplexer is being used for a write access, and independently of the value of eccEnable 326, the ECC syndrome and parity bit are generated, and written with the write data to memory as eccBus[7:0] 216. If the muxMemRNotW 312 input is low and eccEnable is high, then the corrected output from the Cpu Register is loaded into the Cpu Register if cpuMSBEnable 313 and cpuLSBEnable 314 are asserted, to permit an atomic hardware scrub operation to be performed. This input is sampled on the rising edge of memoryClock 311.

eccErrScanEn signal 325 is coupled to ECC block 308. The eccErrScanEn input 325 gates the notCorrect output 301 and the notEccError 302 output. A low level on the eccErrScanEn input 325 forces the values of the notCorrect 301 and notEccError 302 outputs into tri-state. The eccErrScanEn input 325 is held low when memory writes are performed, and while the ECC logic is settling during a memory read, to prevent invalid errors being reported.

When the atpgEnable input is asserted, the eccErrScanEn 325 input is used as scanShiftEnable. This is only done for scan testing; in normal operation, atpgEnable 324 is held low, allowing eccErrScanEn 325 to be used as eccErrorEnable. This input is sampled on the rising edge of memoryClock.

eccBusSwap signal 327 is coupled to multiplexors 309A–309D. The eccBusSwap signal 327 is used during diagnostic testing in the system to exchange the eccBus 216 and bank0[7:0]. This permits an ECC test to be performed without the need to separate the write enables to the eccBus RAM's and the bank[3:0][15:0] RAM's. The eccBusSwap signal is sampled on the rising edge of cpuClock.

atpgEnable signal 324 is coupled to scan path block 321. Scan path block 321 receives testDataIn signal 322 as input and provides testDataOut signal 323 as output. The atpgEnable signal 324 input forces the four independent scan paths to be set up to permit atpg tests to be run. These four scan paths are clocked by the testClock input 319, the cpuMSBEnable input 313, cpuLSBEnable input 314, and the notTestClock signal, which is the inversion of the TestClock input 319. It also causes the eccErrScanEn 325 input to be used as scanShiftEnable. When the scanShiftEnable signal and atpgEnable 324 input are asserted, every register cell is forced to shift data serially, overriding all other data connections to the register cell.

These scan paths can be used for atpg testing, as well as for functional testing of the device under JTAG. Scan test is performed with atpgEnable 324 asserted; a test vector is clocked in through the scan paths with scanShiftEnable asserted, then scanShiftEnable is deasserted, and a single pulse on testClock 319 is used to capture the result of the test vector. The resulting value is clocked out of the scan paths by asserting scanShiftEnable again.

Figure 4:
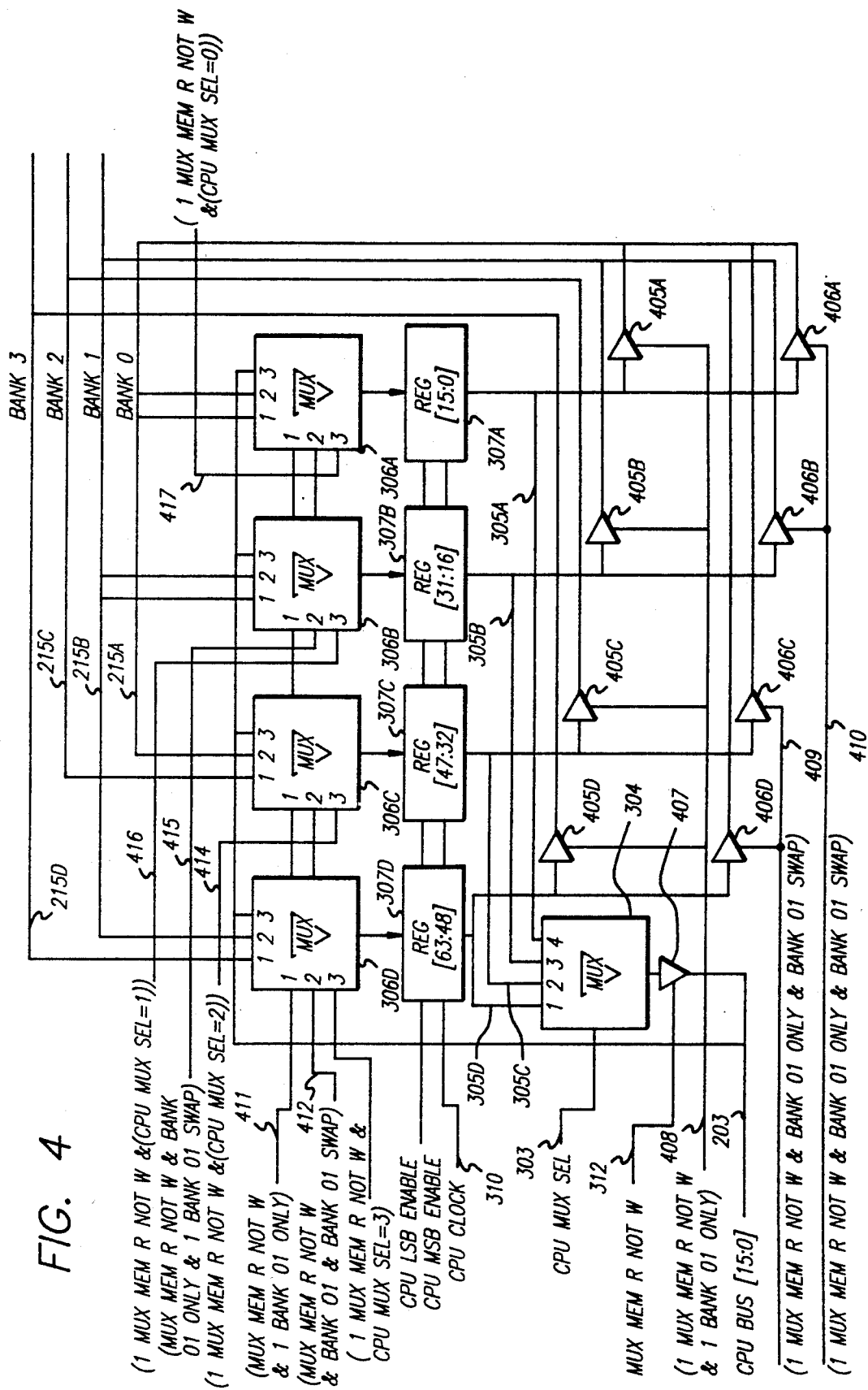
FIG. 4 is a block diagram illustrating the CPU register multiplexing structure of the present invention.

The Cpu register multiplexing structure is illustrated in FIG. 4. Muxes 306A–306D are coupled to CPU registers 307A–307D, respectively. The cpuMuxSel 303 is provided to select multiplexer 304. Select multiplexer 304 provides outputs 305A–305D to CPU registers 307A–307D, respectively. The MUX 304 outputs 305A–305D are also provided to tri-state gates 405A–405D and tri-state gates 406A–406D, respectively. MUX 304 is also coupled through tri-state gate 307 to CPU bus 203. Tri-state gate 407 is enabled by muxMemRNotW 312. Tri-state gates 405A–405D are enabled by signal 408 representing (!muxMemRNotW & !bank01Only).

Tri-state gates 406A and 406B are enabled by signal 410 representing (!muxMemRNotW & bank01Only & !bank01Swap). Tri-state gates 406C and 406D are enabled by signal 409 representing (!muxMemRNotW & bank01Only & bank01Swap). The outputs of tri-state gates 406A, 406C and 405A are coupled to the first and second data inputs of multiplexer 306A and the second data input of multiplexer 306C. The output of tri-state gates 405B, 406B and 406D are coupled to the first and second data inputs of multiplexer 306B and the second data input of multiplexer 306D.

The output of tri-state gate 405C is coupled to the first data input of multiplexer 306C. The output of tri-state gate 405D is coupled to the first data input of multiplexer 306D. The third data inputs of multiplexers 306A–306D are coupled to CPU bus 203. cpuMSBEnable signal 313 and cpuLSBEnable 314 are coupled to registers 307A–307D, respectively.

Signal 411, (representing muxMemRNotW & !bank0-1Only) is coupled to the first control input of multiplexers 306A-306D, respectively. Signal 412, (representing muxMemRNotW & bank01Only & bank01Swap) is coupled to the second control inputs of multiplexers 306C and 306D, respectively. Signal 413, (representing !muxMemRNotW & (cpuMuxSel=3)) is coupled to the third control input of multiplexer 306D. Signal 414, (representing !muxMemRNotW & (cpuMuxSel=2)) is coupled to the third control input of multiplexer 306C. Signal 415 (representing muxMemRNotW & bank0-1Only & !bank01Swap) is coupled to the second control inputs of multiplexers 306A and 306B, respectively. Signal 416, (representing !muxMemRNotW & (cpuMuxSel=1)) is coupled to the third control input of multiplexer 306B. Signal 417, (representing (!muxMemRNotW & (cpuMuxSel=0)) is coupled to the third control input of multiplexer 306A.

Figure 5:
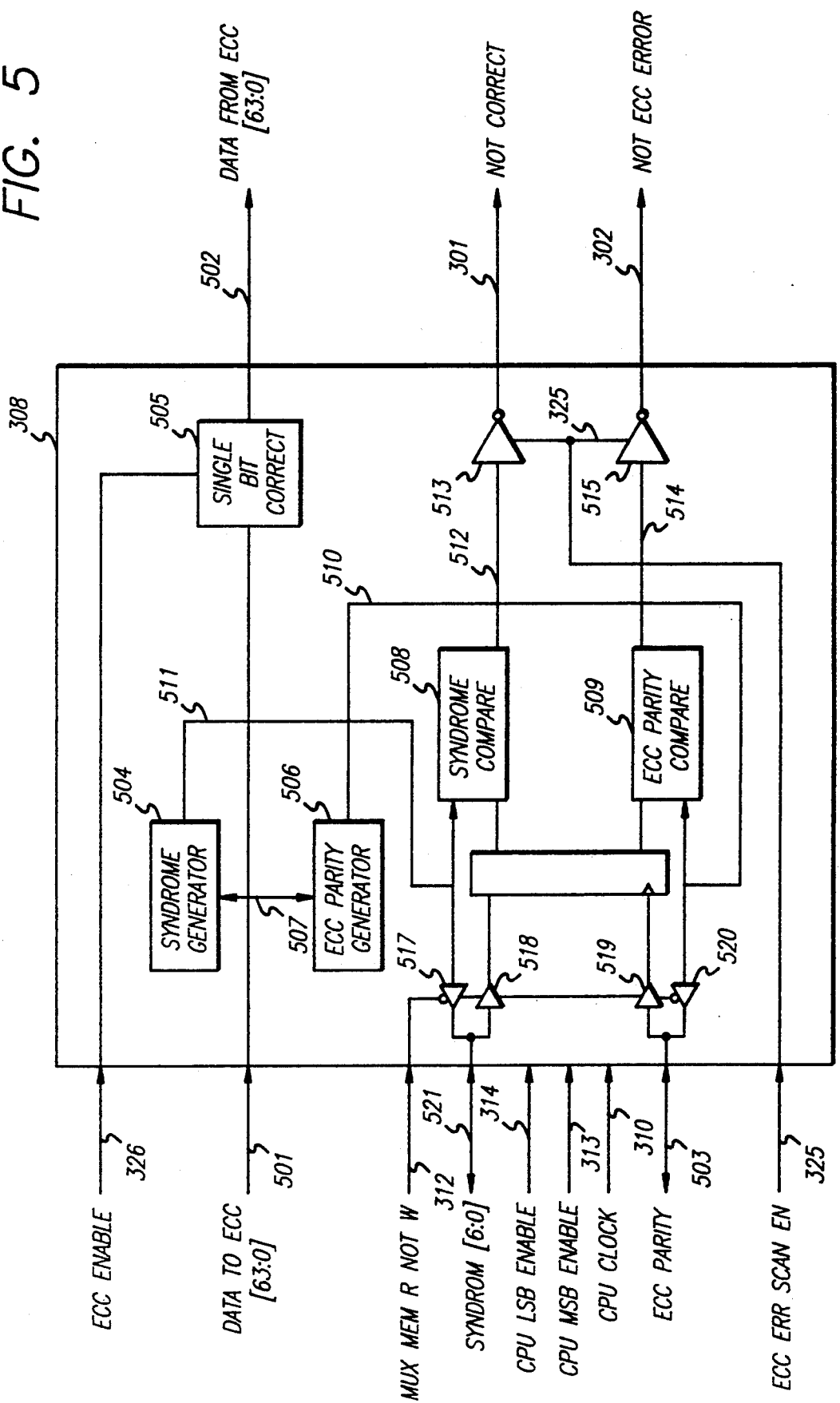
FIG. 5 is a block diagram of the ECC structure of the present invention.

The ECC syndrome and correct block 308 is illustrated in detail in FIG. 5. The ECC syndrome and correction block comprises syndrome generator block 504, single bit correct block 505, ECC parity generator block 506, syndrome compare block 508 and ECC parity compare block 509. The single bit correct block 505 receives data to ECC signal 501 and provides data from ECC output 502.

The syndrome generator block 504 is coupled on lines 507 to ECC parity generator block 506. Syndrome generator block 504 also provides output 511 to syndrome compare block 508. ECC parity generator block 506 provides output 510 to ECC parity compare block 509. Signal 511 is also coupled through tri-state buffer 517 to syndrome bus 521. Syndrome bus 521 is coupled to tri-state buffers 517 and 518. The output of tri-state buffer 518 is coupled to flip-flop 516. ECC parity signal 503 is coupled to tri-state buffer 519 and tri-state buffer 520. The output of tri-state buffer 519 is coupled to flip-flop 516. Output 510 of ECC parity generator 506 is coupled to the input of tri-state buffer 520. The complement of muxMemRNotW signal 312 is coupled to the enable input of tri-state buffers 517 and 520.

cpuLSBEnable signal 314, cpuMSBEnable signal 313, and cpuClockSignal 310 are coupled to flip-flop 516. The output 512 of syndrome compare block 508 is coupled to inverting tri-state buffer 513. The output of inverting tri-state buffer 513 is the notCorrect signal 301. The output 514 of ECC parity compare block 509 is coupled to tri-state buffer 515. The output of inverting tri-state buffer 515 is the notECC error signal 302. eccErrScanEn 325 is coupled to the enable input of inverting tri-state buffer 513 and 515.

Figure 6:
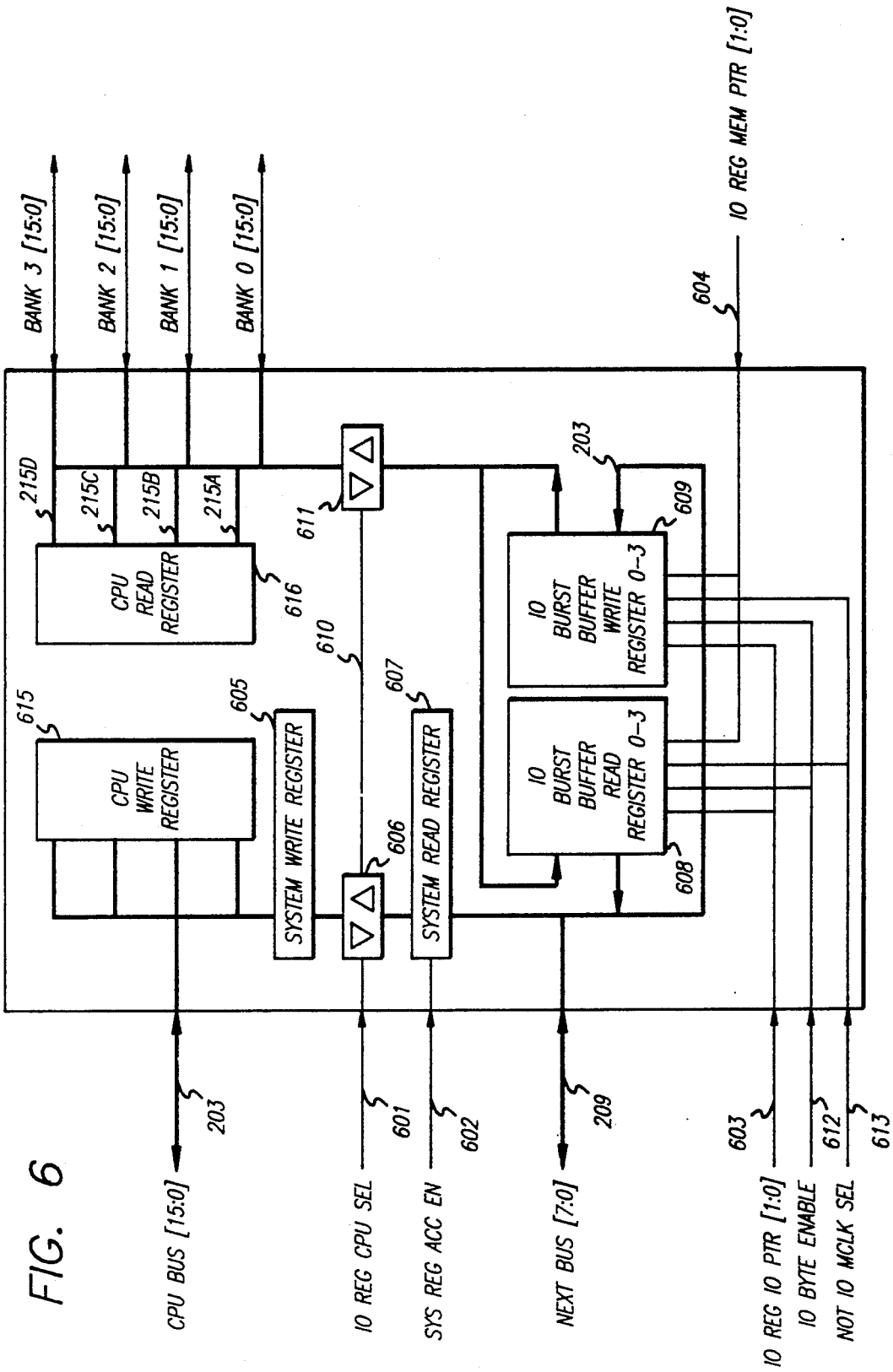
FIG. 6 is a block diagram illustrating the register data path of the present invention.

FIG. 6 is a block diagram of the register data path of the present invention. The register data path includes CPU write register 615, CPU read register 616, system write register 605, system read register 607, I/O burst buffer read 608 and I/O burst buffer write 609. The CPU bus 203 provides data to CPU write register 615. The CPU read register 616 is coupled to the DRAM banks on lines 215A-215D. (Although shown in FIG. 6 as separate read and write registers, CPU read and write registers 615 and 616 can be implemented as a single read and write register if desired). The CPU bus 203 is coupled through a system write register 605 to direction control block 606. The direction control block 606 is controlled by ioRegCpuSel 601.

The I/O register or CPU register selector input, ioRegCpuSel 601, replaces the connection between the cpuBus and the CPU register with a connection between the cpuBus and the ioBus, and also replaces the connection between memory (bank[3:0][15:0]) and the CPU register with a connection between memory and the I/O Burst Buffer. Thus, a CPU can perform a System Register access (an access by the CPU onto the I/O bus), without latching the data in the I/O Burst Buffer for a write, and a memory access performed by the Memory Controller on behalf of the I/O Bus Manager can write I/O data from the I/O Burst Buffer to memory, or read I/O data from memory to the I/O Burst Buffer.

If muxMemRNotW 312 is high (for a read), with ioRegCpuSel 601 asserted, the 64 bits of data from the corrected output of the CPU register are latched into the selected IoReadRegister on the positive edge of I/O busClock. If ioBusRNotW 706 is low (for a write), and ioRegCpuSel 601 is asserted, the 64 bits of data from the selected one of the four 64-bit ioWriteRegisters are driven into the ECC syndrome generator and the bank outputs for a memory access. The data stored in the IoReadRegister is held until the next positive edge of memoryClock when ioRegCpuSel 601, cpuMSBEnable 313, cpuLSBEnable 314, and muxMemRNotW 312 are asserted, the contents of the ioWriteRegister is held until the next positive edge of ioClock when ioByteEnable 612 is asserted and both ioRegCpuSel 601 and ioBusRNotW 706 are negated.

In order to allow both a DMA read from memory to be performed into the IoReadRegister, while another of the four IoReadRegisters is being outputted onto the NextBus 209, the ioRegCpuSel input 601 only connects the cpuBus to the NextBus 209 outputs if ioRegMemPtr 601 is equal to ioRegIoPtr 603. Thus, it is necessary to make ioRegMemPtr 604 equal to ioRegIoPtr 603 for access from the CPU's to the System Registers.

The ioRegCpuSel 601 input is controlled by the Memory Controller in the memoryClock frequency domain. The other ioBus signals, which are in the ioClock frequency domain, are controlled by the I/O Bus Manager. This input is sampled on the rising edge of memoryClock.

The cpuMSBEnable input 313 also enables the latching of the most significant bytes of each 16-bit group of data from the ECC corrected output of the cpuRegister into the selected IoReadRegister when ioRegCpuSel is high and muxMemRNotW is high (for a read), on the positive edge of cpuClock.

The cpuMSBEnable also loads the most significant byte of the System Write Register if muxMemRNotW 312 is negated and ioRegCpuSel 601 is asserted. This register is used as a write buffer for System Register accesses. This input is sampled on the rising edge of cpuClock.

The cpuLSBEnable signal 314 input also enables the latching of the least significant bytes of each 16-bit group of data from the ECC corrected output of the cpuRegister into the selected IoReadRegister when ioRegCpuSel 601 is high and muxMemRNotW is high (for a read), on the positive edge of cpuClock 310.

The cpuLSBEnable signal 314 also loads the least significant byte of the System Write Register if muxMemRNotW 312 is negated and ioRegCpuSel 601 is asserted. This register is used as a write buffer for System Register accesses. This input is sampled on the rising edge of cpuClock 310.

The flow directional control block 606 is also coupled to system read register 607. System read register 607 receives as input SysRegAccEn signal 602. The ioRegCpuSel signal 601 is also coupled on line 610 to directional control block 611. Block 611 controls the flow between the DRAM side of the CPU registers and the burst buffers 608 and 609. For a burst read operation, block 611 provides flow from the DRAM banks to I/O burst buffer read block 608. For writes, block 611 provides a flow path from I/O burst buffer write block 609 to the DRAM banks. The quad burst buffers 608 and 609 are controlled by three signals. These signals are ioRegIoPtr signal 603, ioByteEnable signal 612, and notIoMclkSel signal 613.

The ioRegIoPtr control inputs 603 select access from the I/O bus for one of the write registers in the I/O burst buffers, ioWriteRegister0, ioWriteRegister1, ioWriteRegister2, or ioWriteRegister3, for the I/O bus manager to load into. The ioRegIoPtr control inputs 603 also select access to the I/O bus for one of the read registers in the I/O burst buffers, ioReadRegister0, ioReadRegister1, ioReadRegister2, or ioReadRegister3, for the I/O bus manager to drive onto the I/O bus.

TABLE 3

| I/O Burst Buffer Register I/O bus Selection | |
|---|---|
| ioRegIoPtr[1:0] | I/O Register Selected |
| 3 | register3 |
| 2 | register2 |
| 1 | register1 |
| 0 | register0 |

The four registers can be used as a circular buffer for reading from memory or writing to memory.

These inputs are sampled on the rising edge of ioClock.

The other control signal of buffers 608 and 609 is ioRegMemPtr signal 604.

The ioRegMemPtr control inputs 604 select access to the CPU bus for one read registers in the I/O burst buffers, ioReadRegister0, ioReadRegister1, ioReadRegister2, or ioReadRegister3, for the memory controller to read into. The ioRegMemPtr control input selects access to the CPU bus for one of the write registers in I/O burst buffers, ioWriteRegister0, ioWriteRegister1, ioWriteRegister2, or ioWriteRegister3, for the memory controller to write from.

TABLE 4

| I/O Burst Buffer Register Memory Section | |
|---|---|
| ioRegMemPtr[1:0] | IO Register Selected |
| 3 | register3 |
| 2 | register2 |
| 1 | register1 |
| 0 | register0 |

These inputs are sampled on the rising edge of ioClock.

Figure 7:
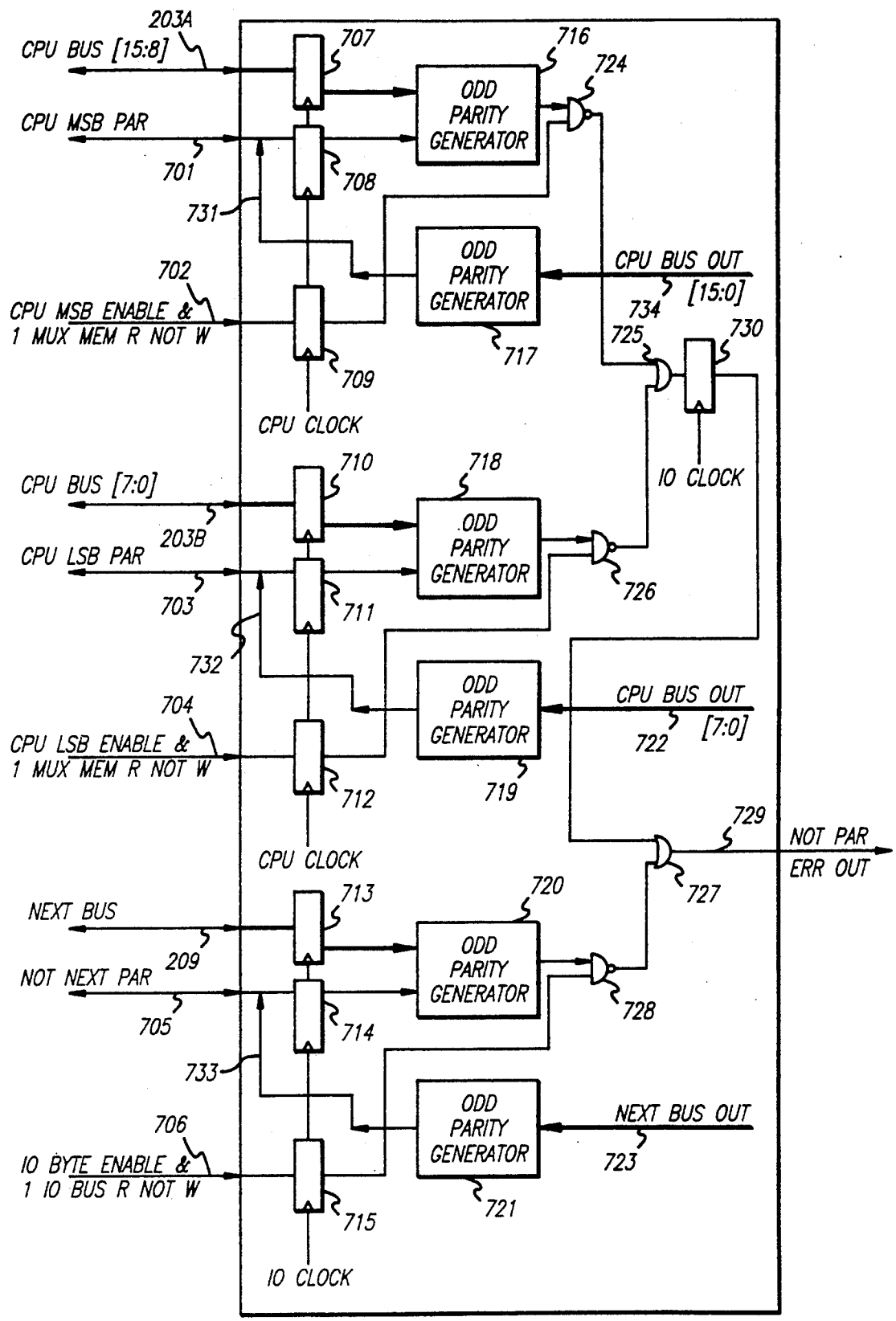
FIG. 7 is a block diagram illustrating the parity error logic of the present invention.

FIG. 7 illustrates the parity error logic of the present invention. In the preferred embodiment, half of bits of the CPU bus 203 (in FIG. 7, bits 15-8) and here designated as line 203A, are provided through flipflop 707 to odd parity generator block 716. cpuMSBPar signal 701 is provided through flipflop 708 to odd parity generator block 716. Signal 701 is the most significant byte parity signal from the CPU and is delivered at the same time as the data on the CPU bus 203A. The byte parity is computed to generate odd parity (byte is correct if an odd number of the combination of the 8 data bits plus the byte parity bit are 1). Therefore, if there is a read from the CPU bus 203A, cpuMSBPar is output high if an even number of the most significant bits are high and cpuMSBPar is output low if an odd number of the CPU bus bits are high. The output of odd parity generator block 716 is coupled to one input of NAND gate 724. The other input of NAND gate 724 is provided by signal 702 which represents cpuMSBEnable & !muxMemRNotW (provided through flipflop 709). Flipflops 707-709 are clocked by cpuClock.

The most significant bits of cpuBusOut 734 are coupled to odd parity generator 717. The output 731 of parity generator 717 is coupled to the cpuMSBPar line 701.

The least significant byte (bits 7 through 0 of the CPU bus signal 203 here designed as line 203B) is provided through flipflop 710 to odd parity generator block 718. cpuLSBPar signal 703 is provided through flipflop 711 to the odd parity generator block 718. cpuLSBPar represents the least significant byte parity signal from the CPU. The CPU delivers this byte parity signal at the same time as the data on the CPU bus 203B. The byte parity is computed to generate odd parity. If there is a read from the CPU bus, cpuLSBPar is output high if an even number of the CPU bus bits are high and cpuLSBPar is output low if an odd number of the CPU bus bits are high. The output of odd parity generator 718 is provided as one input to NAND gate 726. The other input of NAND gate 726 is the output of flipflop 712. The input of flipflop 712 is signal 704 representing cpuLSBEnable&!muxMemRNotW. Flipflops 710-712 are clocked by cpuClock.

The outputs of NAND gates 724 and 726 are coupled as inputs to OR gate 725. The output of OR gate 725 is coupled to flipflop 730. The output of flipflop 730 is coupled as one input to OR gate 727.

The least significant byte of cpuBusOut signal 722 is coupled to odd parity generator block 719. The output 732 of parity generator block 719 is coupled to the cpuLSBPar line 703.

For burst error checking, bus 209 is coupled through flipflop 713 to odd parity generator block 720. A notNextPar signal 705 is coupled through flipflop 714 to the parity generator block 720. The notNextPar signal is an inverted odd parity bit, and is provided from the NextBus 209 bus and is delivered along with the bus data. This signal is sampled on the rising edge of ioClock or DSTB* and driven out on the rising edge of I/O busClock. The bus 209 delivers byte parity at the same time as the data on the NextBus 209. The byte parity is computed to generate odd parity. Therefore, if there is a read from the NextBus 209, notNextPar signal 705 is low if an even number of the NextBus 209 bits are low, and notNextPar is output high if an odd number of the NextBus 209 bits are low.

The output of parity generator 720 is coupled as one input to NAND gate 728. The other input to NAND gate 728 is the output of flipflop 715. The input of flipflop 715 is signal 706, representing ioByteEnable&!ioBusRNotW. Flipflops 713-715 are clocked by ioClock signal. The I/O busOut signal 723 is coupled to odd parity generator block 721. The output 733 of odd parity generator block 721 is coupled to the notNextPar line 705.

The output of NAND gate 728 is coupled as the other input of OR gate 727. The output 729 of OR gate 727 is the notParErrOut signal. The notParErrOut signal 729 indicates that a qualified parity error has been found. This output is only asserted low when one of the three qualified byte parity errors is detected during or after an I/O or a CPU write. The qualified parity errors are:

1. ioByteEnable 706 asserted, ioBusRNotW 706 is negated, and odd parity failure on NextBus 209;

2. cpuMSBEnable 313 asserted, muxMemRNotW 312 is negated, and odd parity failure on cpuBus 203A; and 3. cpuLSBEnable 314 asserted, muxMemRNotW 312 is negated, and odd parity failure on cpuBus 203B.

The notParErrOut output 729 is asserted for one of two ioClock cycles (to allow it to be sampled directly by the status register, which is clocked by the ioClock) after a parity error is detected. It is delayed by one ioClock to reduce skew to the register. If the parity error is for the NextBus 209, the notParErrOut 729 is asserted on the I/O major clock cycle, when notIoMClkSel 613 is low. If the parity error is for the CPU bus, the notParErrOut 729 is asserted on the I/O minor clock cycle when notIoMClkSel 613 is high. This permits the two types of parity error to be distinguished while using only a single output.

When there is no error present, the notParErrOut signal 729 is held in tri-state. When the CPU bus is being used for a read, the notParErrOut signal 729 is precharged high. The muxMemRNotW input 312 is synchronized to ioClock to control the precharging of the notParErrOut signal 729. It can be directly connected to the active low notParErrOut output 729 of another multiplexer and to the notBusParity input of the memory controller. It has a pull-up resistor connected to it with a nominal value of 10 Kohms.

The I/O data bus, (an inverted multiplexed address-/data bus using in the preferred embodiment, the I/O bus protocol) is connected to an 8-bit wide data bus referred to as NextBus 209. Multiple multiplexers using the present invention may be used to connect up to a full 32-bit wide I/O data bus. The data is sampled on the rising edge of ioClock or on the rising edge of DSTB*, and driven on the rising edge of the I/O busClock. The input data is delayed by one ioClock period to allow the I/O bus controller time to set up the ioMuxSel inputs for the I/O bus transaction master.

Figure 8:
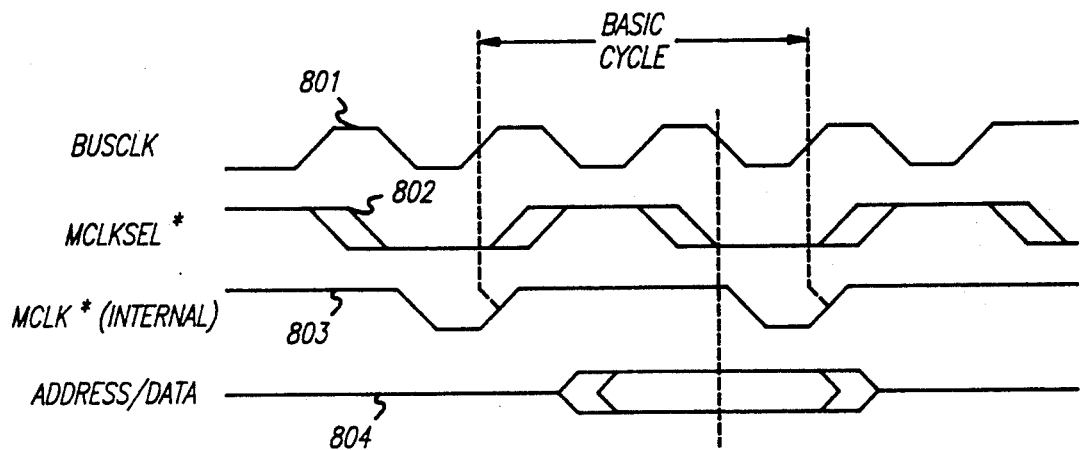
FIG. 8 is a timing diagram illustrating bus timing for single word DMA I/O transfers.

In the preferred embodiment of the present invention, bus 209 is a bus known as the "NextBus" and is described in NextBus Specification, published by NeXT Computer, Inc., Redwood City, Calif. The NextBus is a synchronous, multiplexed, multimaster bus that provides a "strictly fair" arbitration mechanism. Bus slots are addressed geographically and their arbitration scheme is not daisy-chained. NextBus is a superset of NuBus, which is defined by IEEE standard 1196. The NextBus has different clocks, data transfer rate and electrical interface than NuBus. Timing for the NextBus is derived from a BusClk signal illustrated in FIG. 8. BusClk signal 801 is a 25 megahertz system clock. An MCLKSEL* signal 802 selects every other low phase of BusClk 1401. MCLKSEL* is the logical OR of BusClk and MCLKSEL*. MCLK* signal 803 provides timing for control signals and for single word transfers on the NeXT Bus as illustrated by signal 804.

Figure 9:
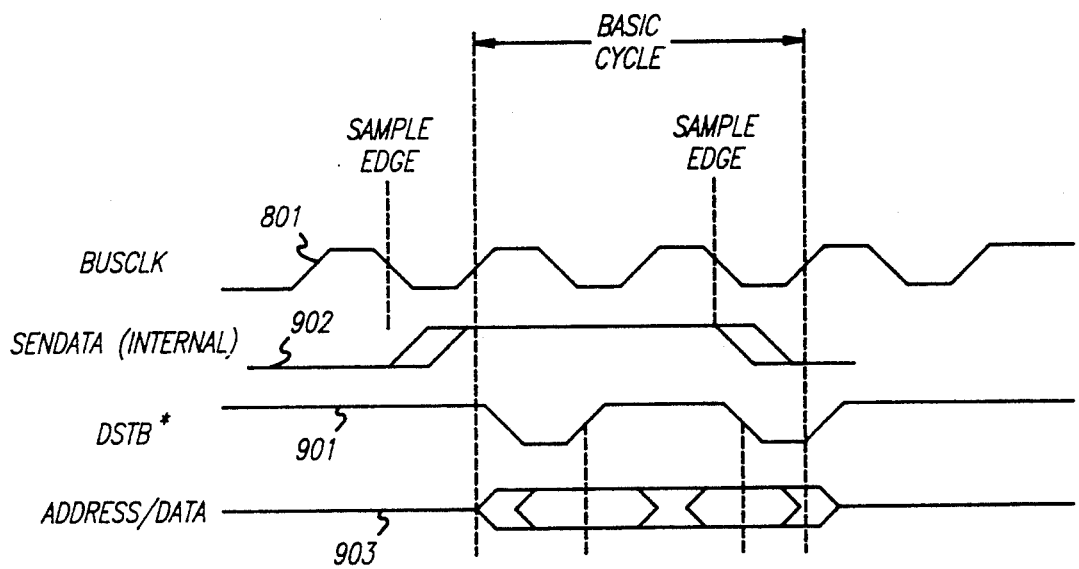
FIG. 9 is a timing diagram illustrating bus timing for burst DMA I/O transfers.

Referring now to FIG. 9, a data strobe signal 901 provides a timing reference for data when bursts of data are transferred. During burst transfers, the data sender provides the DSTB* signal 901 with the data. The receiver captures data on the rising edge of DSTB* 901 as illustrated in FIG. 9. The DSTB* 901 is the logical NAND of BusClk 801 and send data signal 902. The send data signal 902 indicates that two words of data are to be transferred during the major clock cycle as shown by address data signal 903.

Thus, a DRAM multiplexor has been described.

We claim:

1. A memory multiplexor for providing an interface between a processing means and a plurality of memory banks comprising:
   a first bus for communicating with said processing means;
   multiplexing means coupled to said first bus;
   a plurality of registers coupled to said multiplexing means;
   error correction means coupled to said plurality of registers;
   a second bus coupled to said error correction means and to said plurality of memory banks.

2. The multiplexor of claim 1 wherein said first bus comprises a sixteen bit bus.

3. The multiplexor of claim 2 wherein said second bus comprises a 64 bit bus.

4. The multiplexor of claim 1 wherein said multiplexing means comprises a four to one multiplexor.

5. The multiplexor of claim 1 wherein said plurality of registers are such that a memory access can be overlapped with a data transfer.

6. The multiplexor of claim 1 wherein said error correcting means generates an error correction syndrome when data is written to said plurality of memory banks and said syndrome and said data are both provided to said memory banks.

7. The multiplexor of claim 1 wherein said plurality of registers includes a first plurality of read registers and a second plurality of write registers.

8. A method of communicating between a central processing unit (cpu) and a storage means comprised of a plurality of memory banks, said method comprising the steps of:
   providing data words from said cpu to a multiplexor interface means coupled to said cpu and said memory banks;
   storing a first number of said data words in registers in said interface means;
   outputting a data word burst to said memory banks, said data word burst comprising said first number of data words;
   storing said data word burst in memory banks.

9. The method of claim 8 further including the steps of:
   generating an error correction syndrome in said interface means from said first number of data words;
   transmitting said syndrome from said interface means to said memory banks with said data word burst.

10. The method of claim 9 wherein said first number of data words comprises four data words from said first bus.

11. The method of claim 10 wherein said syndrome is generated by an ECC error correction module.

12. A method of communicating between a central processing unit (cpu) and a storage means comprising a plurality of memory banks, said method comprising the steps of:
   providing a data word burst comprising a first number of data words from said memory banks to a multiplexor interface means coupled to said cpu and to said memory banks;
   storing said first number of data words in a plurality of registers in said interface means;

transmitting said first number of data words from said registers to said cpu.

13. The method of claim 12 further including the steps of:
   transmitting an error correction syndrome to said registers with said data word burst;
   comparing said transmitted error correction syndrome to a previously stored error correction syndrome;
   determining if an error exists in said data word burst;
   correcting said data word burst when an error exists.

14. The method of claim 13 wherein said first number of data words comprises four data words.

15. The method of claim 14 wherein said step of comparing said transmitted error correction syndrome to said previously stored error correction syndrome is performed in an error correction module of said multiplexor interface means.

16. The method of claim 12 further including the step transmitting another data word burst from said memory banks to said interface means while said step of transmitting said first number of data words from said registers to said cpu is performed.

17. A method of communicating between a direct memory access (DMA) device and a storage means comprised of a plurality of memory banks, said method comprising the steps of:
   providing data words from said DMA device to a multiplexor interface means coupled to said DMA device and said memory banks;
   storing a first number of said data words in registers in said interface means;
   outputting a data word burst to said memory banks, said data word burst comprising said first number of data words;
   storing said data word burst in memory banks.

18. The method of claim 17 further including the steps of:
   generating an error correction syndrome in said interface means from said first number of data words;
   transmitting said syndrome from said interface means to said memory banks with said data word burst.

19. A method of communicating between a direct memory access (DMA) device and a storage means comprising a plurality of memory banks, said method comprising the steps of:
   providing a data word burst comprising a first number of data words from said memory banks to a multiplexor interface means coupled to said DMA device and to said memory banks;
   storing said first number of data words in a plurality of registers in said interface means;
   transmitting said first number of data words from said registers to said DMA device.

20. The method of claim 19 further including the steps of:
   transmitting an error correction syndrome to said registers with said data word burst;
   comparing said transmitting error correction syndrome to a previously stored error correction syndrome;
   determining if an error exists in said data word burst;
   correcting said data word burst when an error exists.

* * * * *